United States Patent Office 3,004,002
Patented Oct. 10, 1961

3,004,002
HOMOPOLYMERS OF 1,3 BIS-(HYDROXYMETHYL) 2-IMIDAZOLIDONES OR IMIDAZOLITHIONES
Earl Kaplan, North Plainfield, and Joseph C. Morath, Bound Brook, N.J., assignors to American Cyanamid Company, New York, N.Y., a corporation of Maine
No Drawing. Filed May 26, 1958, Ser. No. 737,983
18 Claims. (Cl. 260—67.5)

This invention relates to methods of making novel polymeric compositions of matter. This invention further relates to methods for the self-condensation of heterocyclic compounds, such as substituted 2-imidazolidones and 2-imidazolithiones and to the novel polymeric products produced thereby. More specifically, this present invention relates to the novel methods for the polymerization of 1,3-bis-(hydroxymethyl) 2-imidazolidones and/or 1,3-bis-(hydroxymethyl) 2-imidazolithiones under acidic conditions and to the polymers produced thereby, which polymers are characterized in having the respective heterocyclic units comprising same, joined to one another by essentially methylene linkages.

An object of this invention is to produce novel polymers.

Another object of this invention is to control the manner of polymerization of monomeric compositions so as to obtain polymer products having unusual properties.

Still another object is to provide a novel class of nitrogen-containing, linear polymers which exhibit unique properties when employed in a number of use applications. These and other objects of this present invention will be apparent to those skilled in the art, especially upon consideration of the detailed discussion and examples set forth hereinbelow.

Methylolated substituted carbamides, as exemplified by 1,3-bis-(hydroxymethyl) 2-imidazolidone and 1,3-bis-(hydroxymethyl) 2-imidazothione, conventionally referred to as dimethylolethylene urea and dimethylolethylene thiourea, respectively, are well-known. The N,N' substituted carbamides may be conveniently prepared by the reaction of ethylene diamine with urea or thiourea. Thus, the dimethylol derivatives of these carbamides can be readily prepared by reaction with formaldehyde. It is also known that these methylated substituted ureas or sulfoureas may be dehydrated when heated alone, or under alkaline conditions in an aqueous medium to produce water-soluble polymers. In such a polymerization or self-condensation reaction, it is generally understood that the polymerization takes place in a manner whereby the monomeric units of the polymer are joined together through ether linkages. In this manner, addition of the various units occur when two methylol groups react with the resulting splitting out of water. As mentioned hereinabove, these water-soluble polymers are well-known in the art and have been used primarily and extensively in the textile field for producing textile finishes which exhibit improved properties.

We have discovered that new and different types of polymers can be prepared from the above-mentioned methylolated substituted carbamides. Our invention is based on the discovery that a new class of polymers may be obtained by polymerizing monomeric compounds such as dimethylolethylene urea and dimethylolethylene thiourea employing acidic conditions during the condensation reaction. Our novel polymers, while similar to the prior art polymers in that they contain repeating units of the heterocyclic radicals, are fundamentally different in that the monomeric units are linked together in a dissimilar manner than that exemplified in the aforesaid prior art polymers. The unit structure of our products and the reasons supporting such assumption will be discussed in detail hereinbelow. The novel polymers prepared in accordance with our invention are suitable for use in a plurality of applications where the presence of a resinous material is desired. Our novel products are especially useful as recrystallization retarders in soluble vat dye printing compositions and as anti-thixotropic agents in a number of particular applications where undesired thixotropic characteristics develop. In general, these polymers made in accordance with this present invention are useful as thinning agents or dispersing agents for maintaining fluidity in highly concentrated dispersions of chemicals prone to develop thixotropic characteristics.

The polymers of this invention are obtained by heating the dimethylolated derivatives of the particular heterocyclic compound used in the presence of an acid catalyst. As indicated hereinbefore, one may use a methylolated 2-imidazolidone or 2-imidazolithione in this manner. Additionally, one may employ a dimethylol 2-imidazolidone and dimethylol 2-imidazolithione carrying substituents in the numeral 3 and in the numeral 4 positions thereof. Such substituents are preferably lower alkyl groups such as methyl, ethyl and propyl primarily to facilitate the preparation of the novel polymers of this invention in an aqueous system. Obviously, mixtures of these various compounds may be used.

Although this broad group of heterocyclic compounds may be used, we prefer to employ dimethylolethylene urea as it is conveniently available, relatively inexpensive, free of any odor problems and permits the preparation of polymers having an optimum degree of hydrophilic and other desirable characteristics.

The polymeric methylene imidazolidones of this invention may be graphically illustrated as follows:

$$HOCH_2\left[\begin{array}{c}CH_2-CH_2\\|\quad\quad|\\-N\quad\quad N-CH_2-\\ \diagdown C \diagup \\ \| \\ X\end{array}\right]_n\begin{array}{c}CH_2-CH_2\\|\quad\quad|\\-N\quad\quad N-CH_2OH\\ \diagdown C \diagup \\ \| \\ X\end{array}$$

wherein X is O or S and $n$ in an integer greater than 2. This attributed structure of the polymers is supported in part by infra-red examination data and by chemical analysis. The reaction scheme of the self-condensation process resulting in this type of polymer is believed to be that indicated directly hereinbelow.

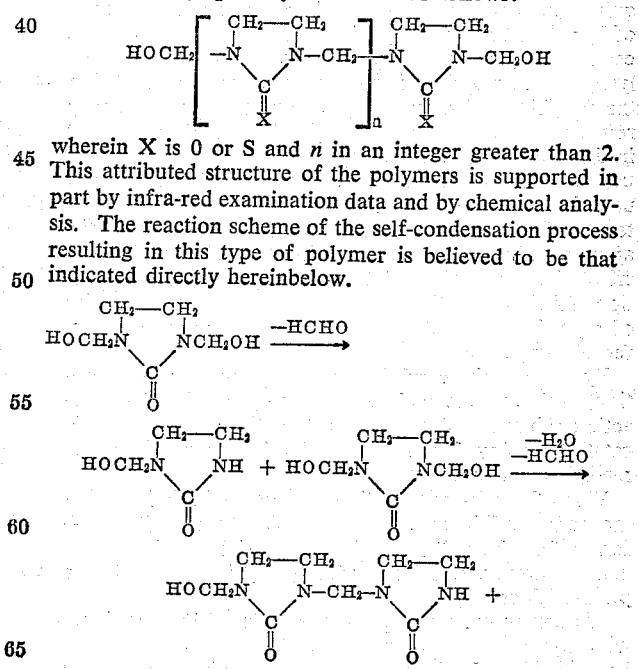

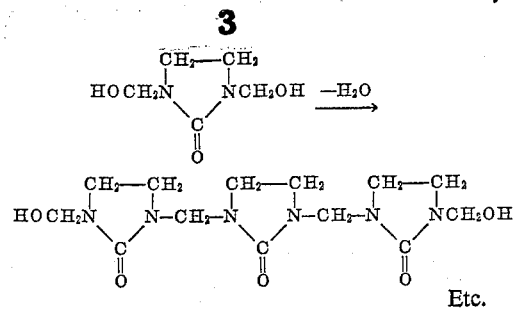

Etc.

In the practice of our invention, the polymerization process may be accomplished by heating the monomer in an aqueous medium in the presence of an acid catalyst. An important embodiment of this invention resides also in reacting the desiccated monomer in the vaporous presence of a readily volatilizable aqueous acid catalyst solution.

Where an aqueous solution is employed in preparing these polymers, the reaction may be carried out at temperatures ranging from 25° C. to 100° C. The preferred range of reactable solids in an aqueous reaction system ranges between about 50 to 90%. This preferred range is primarily governed by economical considerations since there is no inoperative lower limit. The time required to obtain a suitable product will, in general, be a variable factor. The length of time for carrying out this reaction will depend, in the main, upon the temperature employed, the amount and specific type of acid catalyst employed and the desired degree of polymerization.

Various acid catalysts may be used to effect the condensation of the dimethylolated compounds to achieve the linking together thereof with methylene linkages. Illustrative of these acids are inorganic acids such as hydrochloric, sulfuric, nitric and phosphoric; organic acids such as the aliphatic acids, e.g. acetic and the aromatic acids, e.g. toluene sulfonic. Also, the salt formed by reacting metals such as zinc and magnesium with the aforementioned inorganic acids may be suitably employed. However, the preferred catalyst is hydrochloric acid. The amount of catalyst that may be used can be varied over a comparatively wide range. Suitable amounts have been found to range from about 1 to 10 percent of the acid catalyst based on the amount of the monomer employed. Lesser amounts of catalyst may be used, however, because of the increased reaction time required to obtain a suitable polymeric product, the use of less than 1% of catalyst based on the monomer is not economically attractive. Similarly, an amount of catalyst exceeding 10% of the monomer can be used, but the possibility that such large amounts of catalysts may result in equipment corrosion problems and may result in difficulty in removing the catalyst from the final product renders the use of excessive amounts of catalyst undesirable. Therefore, it is to be understood that the term "effective amount" of acid catalyst, as used in the appended claims means a quantity of catalyst which will effect the production of the novel polymeric compositions of this invention regardless of whether the choice of a particular quantity of catalyst falls without our preferred range.

By varying the conditions of the polymerization reaction, such as time and temperature and pH of the reaction mixture and to some extent the amount of acid catalyst employed, the degree of polymerization may be readily controlled.

When the self-condensation processes of this invention are conducted in an aqueous reaction system, it is preferred that the pH be in the range of from about 1 to 4.5. However, suitable products may be prepared at a pH as high as 6.5.

We contemplate that products produced in accordance with our invention are products containing at least three heterocyclic units linked together. It has been found that it is necessary to at least reach the trimer configuration in order to achieve products having optimum properties in the number of applications in which these products are particularly useful. For instance, it has been determined that a dimer of the 2-imidazolidones or the 2-imidazolithiones are not effective recrystallization retarders. Products having up to about 20 heterocyclic units may be readily obtained, depending upon the conditions hereinbefore mentioned. It is also possible to obtain products made up of more than 20 units. In order to achieve the more highly polymeric products, i.e., products composed of 20 or more monomeric units, it is generally desirable to heat the monomeric material in the presence of acidic vapors rather than to employ the aqueous system referred to hereinabove. Particulars with regard to the production of these various polymerized products will be shown in the specific examples hereinbelow.

The number of units constituting a particular polymerization product can be ascertained by the cryoscopic determination of the molecular weight thereof. (Reference: Noller, "Chemistry of Organic Compounds" Saunders Company, Philadelphia, 1955, page 21.

According to this method, the molecular weight of the products of this invention can be determined by measuring the lowering of the freezing point of suitable solutions thereof. For example, a known weight in the order of about 0.1 gram of a polymerized dimethylol ethylene urea is dissolved in about 20 grams of water. The solution, contained in a sample tube is chilled in a salt-ice bath until crystals are obtained. The sample is inserted into another, air jacket, tube, immersed in a liquid bath maintained at 2 to 3° C. The melting point of the solution is obtained using a platinum resistance thermometer and a Mueller bridge. Based on these data, the molecular weights are determined by conventional methods.

After the initial polymerization product has been carried to the desired degree of condensation, it is then dried to a temperature ranging from about 50° C. to about 135° C. Drying may be accomplished under atmospheric pressure conditions or in a vacuum. During this drying operation, additional condensation may occur.

The process of this invention and the products obtained therefrom are illustrated in detail in the following examples in which all parts are by weight unless otherwise stated. These examples are given primarily for the purpose of illustration and any specific enumeration set forth therein is not to be considered as a limitation on the case, except as is indicated in the appended claims.

EXAMPLE 1

*Polymerization of dimethylolethylene urea*

To 228 parts of 50% aqueous dimethylolethylene urea monomer solution are added 6 parts of concentrated hydrochloric acid. This mixture is then added to a suitable reaction vessel, equipped with a stirrer, thermometer, and a reflux condenser. The reaction mixture is heated with stirring to 90° C. over a one-hour period. After 75 minutes at 90° C. the reaction mixture is gradually cooled to room temperature. The time used in cooling the reaction batch amounted to about two hours. The mixture is then evaporated in an oven at 100° C. at atmospheric pressure and dried overnight. Upon complete drying of the reaction mixture, 88 parts of residue of a brownish solid polymer is obtained. This monomer has approximately 5 units of the initial monomeric material linked together as determined by cryoscopic determination of molecular weight. This material when used to the extent of 5% in a soluble vat color composition was found to be an excellent recrystallization retardant for the composition.

EXAMPLE 2

This example illustrates the effect of reaction temperature, time of reaction and drying conditions upon products obtained in accordance with this invention.

The procedure of Example 1 is repeated in every detail, except that the temperature of reaction, time of reaction and drying conditions were as indicated in the following table.

TABLE I

| Temp. of Reaction, °C. | Reaction cycle, Hrs. | Reaction System Neutralizer with NaOH | Temp. of Drying, °C. | Polymer color | Approx. Avr. No. of Units [1] | Mol. Wt.[1] |
|---|---|---|---|---|---|---|
| 50-55 | 12 | No | R.T. | Yellow-white | 3 | 394 |
| 60-65 | 16 | No | R.T. | do | 4 | 485 |
| 90-95 | 1¼ | Yes | 100 | White | 3.5 | |
| 90-95 | 1¼ | No | 100 | Brown | 5 | 510 |

[1] Approximate values. Because of minute amounts of impurities, such as the catalyst, associated with the respective products, the indicated values are considered minimum.

EXAMPLE 3

Into a suitable reaction vessel, equipped as in Example 1, were charged 100 parts of a 50% by weight solution of dimethylolethylene urea and 5 parts of 20% aqueous zinc nitrate. The pH of the system was lowered to 3.5 with a requisite amount of concentrated nitric acid. The mixture was heated at 90° C. for 3.5 hours. The reaction mixture was gradually cooled to room temperature whereupon the mixture was neutralized with sodium carbonate, effecting the precipitation of zinc hydroxide, which was then removed by filtration. The reaction composition was then dried at 100° C. to yield a brownish-yellow polymer. This polymer was readily water-soluble and showed unusually effective characteristics when employed as an anti-thixotropic agent in various antioxidant compositions.

EXAMPLE 4

A dry sample of 1,3,-bis-(hydroxymethyl) 2-imidazolidone (dimethylolethylene urea) was obtained using a conventional freeze-drying technique. The dried sample was then suitably suspended in a reaction vessel equipped with a thermometer and vented to the atmosphere. Aqueous hydrochloric acid vapor (37% HCl) was constantly fed into the reaction vessel so as to cause the sample of dimethylolethylene urea to be in constant contact therewith. The sample was exposed to the acid vapor in this manner for approximately one hour, whereupon a polymer was obtained which had a molecular weight of about 2000, indicating the polymer to be made up of about 20 units of the monomer. The polymerized material exhibited low water-solubility properties.

By practicing the polymerizing technique employed in this example, polymers composed of from about 5 up to about 20 units of the monomer can be readily prepared. Employing a lower reaction temperature and observing shorter reaction time will result in lower degrees of polymerization than that obtained by observing the reaction conditions of this specific example. Also, polymers may be obtained which are composed of more than 20 units of the monomeric material by employing a longer reaction period.

EXAMPLE 5

This example serves to verify the attributed modes of polymerization obtained in the practice of this invention and in the practice of polymerizing the dimethylol derivative of ethylene urea in the absence of an acid catalyst.

Example 1 was repeated in every detail except no catalyst was employed in the polymerization process. This product was then compared with the product obtained in Example 1 from the standpoint of chemical and infra-red analysis. The polymeric product of this example was found to contain twice as many mols of formaldehyde per mol of ethylene urea as did the resin prepared according to the process of Example 1. Also, it was noted that the nitrogen to oxygen ratio increased from 1.1:1 to 1.5:1 and the carbon to oxygen ratio increased from 2.7:1 to 3.4:1 when acid was employed to catalyze the self-condensation reaction.

The chemical analysis data indicate that carbon and oxygen in the form of formaldehyde are lost when the resin is cured in the presence of an acid catalyst in accordance with this invention. The chemical data was substantiated by infra-red studies of the respective resins. The infra-red spectra were obtained on the samples in the form of Nujol mulls using a Perkin-Elmer Model 21 double beam spectrophotometer by standard procedure. Such observations indicate that the condensation reaction carried out in the presence of an acid results in the formation of methylene bridges, whereas when an acid catalyst is not used a saturated ether linkage constitutes the various bridges linking the monomeric units.

The product of Example 1 and the product of the instant example were tested as recrystallization retardant agents for a soluble vat golden yellow dye composition wherein the amount of polymer used was 5% based on the dye solids in each instance. The product of Example 1 was found to be extremely effective in preventing recrystallization, whereas the polymer prepared in accordance with this example was inefficient in this manner.

EXAMPLE 6

To a suitable reaction vessel equipped as in Example 1 was charged a mixture of 200 parts of a 50% aqueous solution of dimethylolethyleneurea and 1 part of acetic acid. The pH of the resultant reaction system was about 5.6. The reaction mixture was heated at 85° C. for 3 hours and then discharged onto shallow evaporating vessels. Drying of the reaction product was accomplished at 60° C. After 76 hours, a thick syrupy solution formed and after an additional 60 hours a waxy solid formed. Cryoscopic analysis indicated the product to be a trimer of the starting monomer and infra-red examination showed the presence of the methylene bridge.

EXAMPLE 7

A mixture of 100 parts of a 50% aqueous solution of dimethylolethylene urea and 2.5 parts of toluene sulfonic acid was heated at 85° C. for 2 hours in a reaction vessel equipped as in Example 1. The pH of the reaction mixture was 2.5. The reaction syrup was dried at 60° C. until a completely dry solid was obtained. The molecular weight of the resultant product was determined to be approximately 800.

EXAMPLE 8

A mixture of 10 parts of N,N'-bis-(hydroxymethyl)-ethylenethiourea, 25 parts of water and 0.5 part of toluene sulfonic acid was stirred in a suitable reaction vessel at 65° C. for 2 hours. The product was then dried at 65° C. for 58 hours in a shallow evaporating vessel. A dry white solid was obtained which was slurried in 50 parts of 95% ethanol to remove alcohol-soluble impurities and the purified product was redried. Infra-red examination showed the polymeric product to contain methylene linkages.

In a similar experiment to the above using potassium hydroxide as an alkaline catalyst in place of the toluene sulfonic acid, a pasty oily mass was obtained after 58 hours drying which by infra-red examination appeared to be essentially monomeric.

We claim:

1. A homopolymer represented by the structural formula:

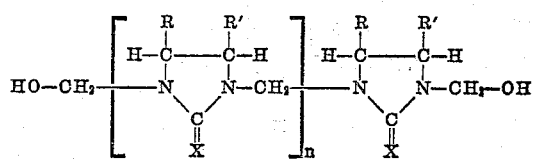

wherein R and R' are selected from the group consisting of hydrogen and lower alkyl, X is selected from the group consisting of oxygen and sulfur and $n$ is an integer at least 2.

2. A homopolymer represented by the structural formula:

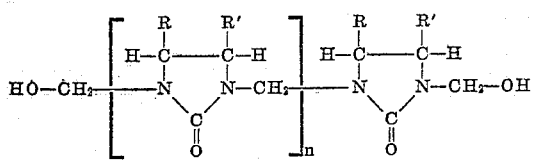

wherein R and R' are selected from the group consisting of hydrogen and lower alkyl and n is an integer at least 2.

3. A homopolymer represented by the structural formula:

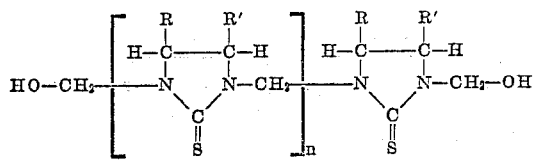

wherein R and R' are selected from the group consisting of hydrogen and lower alkyl and n is an integer at least 2.

4. A homopolymer of 1,3-bis-(hydroxymethyl)2-imidazolidone represented by the structural formula:

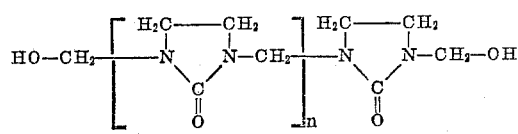

wherein n is an integer at least 2.

5. A homopolymer of 1,3-bis-(hydroxymethyl)2-imidazolithione represented by the structural formula:

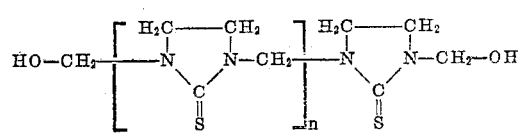

wherein n is an integer at least 2.

6. A process for the preparation of a homopolymer represented by the structural formula:

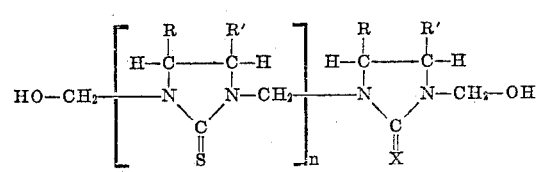

wherein R and R' are selected from the group consisting of hydrogen and lower alkyl, X is selected from the group consisting of oxygen and sulfur and n is an integer at least 2, which consists essentially of self-condensing a monomeric heterocyclic compound selected from the group consisting of 1,3-bis-(hydroxymethyl)2-imidazolidones and 1,3-bis-(hydroxymethyl)2 - imidizalolithiones represented by the structural formula:

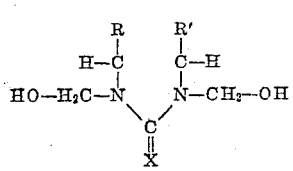

wherein R, R' and X are as defined above, at a temperature from about 25° C. to 100° C. in the presence of an amount of aqueous acid catalyst sufficient to produce a pH of from about 1 to 6.5, and recovering the homopolymer produced.

7. A process for the preparation of a homopolymer represented by the structural formula

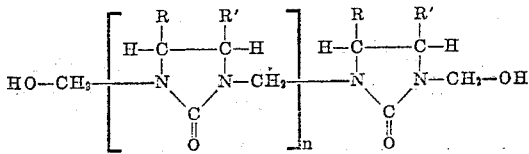

wherein R and R' are selected from the group consisting of hydrogen and lower alkyl and n is an integer at least 2, which consists essentially of self-condensing a monomeric heterocyclic compound selected from the group consisting of 1,3 - bis - (hydroxymethyl)2-imidazolidones represented by the structural formula:

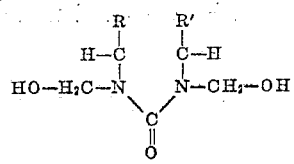

wherein R and R' are as defined above, at a temperature from about 25° C. to 100° C. in the presence of an amount of aqueous acid catalyst sufficient to produce a pH of from about 1 to 6.5, and recovering the homopolymer produced.

8. A process for the preparation of a homopolymer represented by the structural formula:

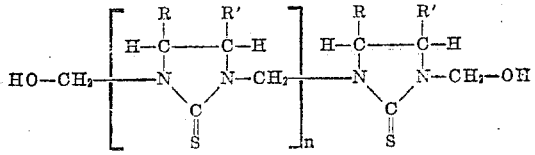

wherein R and R' are selected from the group consisting of hydrogen and lower alkyl and n is an integer at least 2, which consists essentially of self-condensing a monomeric heterocyclic compound selected from the group consisting of 1,3-bis-(hydroxymethyl)2 - imidazolithiones represented by the structural formula:

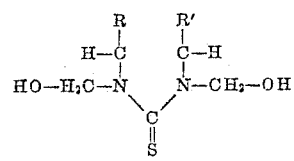

wherein R and R' are as defined above, at a temperature from about 25° C. to 100° C. in the presence of an amount of aqueous acid catalyst sufficient to produce a pH of from about 1 to 6.5, and recovering the homopolymer produced.

9. A process for the preparation of a homopolymer of 1,3-bis-(hydroxymethyl)2 - imidazolidone which consists essentially of self-condensing 1,3-bis-(hydroxymethyl)2-imidazolidone at a temperature from about 25° C. to 100° C. in the presence of an amount of aqueous acid catalyst sufficient to produce a pH of from about 1 to 6.5 and recovering the homopolymer produced.

10. A process for the preparation of a homopolymer of 1,3-bis-(hydroxymethyl)2-imidazolidone which consists essentially of self-condensing 1,3 - bis - (hydroxymethyl)2-imidazolidone at a temperature from about 25° C. to 100° C. in the presence of an amount of aqueous acid catalyst sufficient to produce a pH of from about 1 to 4.5 and recovering the homopolymer produced.

11. A process for the preparation of a homopolymer of 1,3-bis-(hydroxymethyl)2 - imidazolidone which consists essentially of self-condensing 1,3 - bis - (hydroxymethyl)2-imidazolidone at a temperature from about 25° C. to 100° C. in the presence of a catalytic amount of aqueous HCl sufficient to produce a pH of from about 1 to 4.5 and recovering the homopolymer produced.

12. A process for the preparation of a homopolymer of 1,3-bis-(hydroxymethyl)2 - imidazolidone which consists essentially of self-condensing 1,3 - bis - (hydroxymethyl)2-imidazolidone at a temperature from about 25° C. to 100° C. in the presence of a catalytic amount of aqueous acid vapor sufficient to produce a pH of from about 1 to 4.5 and recovering the homopolymer produced.

13. A process for the preparation of a homopolymer of 1,3-bis-(hydroxymethyl)2 - imidazolidone which consists essentially of self-condensing 1,3 - bis - (hydroxymethyl)2-imidazolidone at a temperature from about 25° C. to 100° C. in the presence of a catalytic amount of aqeuous HCl vapor sufficient to produce a pH of from about 1 to 4.5 and recovering the homopolymer produced.

14. A process for the preparation of a homopolymer of 1,3-bis-(hydroxymethyl)2-imidazolithione which consists essentially of self-condensing 1,3 - bis - (hydroxymethyl)2-imidazolithione at a temperature from about 25° C. to 100° C. in the presence of an amount of aqueous acid catalyst sufficient to produce a pH of from about 1 to 6.5 and recovering the homopolymer produced.

15. A process for the preparation of a homopolymer of 1,3-bis-(hydroxymethyl)2-imidazolithione which consists essentially of self-condensing 1,3 - bis - (hydroxymethyl)2-imidazolithione at a temperature from about 25° C. to 100° C. in the presence of an amount of aqueous acid catalyst sufficient to produce a pH of from about 1 to 4.5 and recovering the homopolymer produced.

16. A process for the preparation of a homopolymer of 1,3-bis-(hydroxymethyl)2-imidazolithione which consists essentially of self-condensing 1,3 - bis - (hydroxymethyl)2-imidazolithione at a temperature from about 25° C. to 100° C. in the presence of a catalytic amount of aqueous HCl sufficient to produce a pH of from about 1 to 4.5 and recovering the homopolymer produced.

17. A process for the preparation of a homopolymer of 1,3-bis-(hydroxymethyl)2-imidazolithione which consists essentially of self-condensing 1,3 - bis - (hydroxymethyl)2-imidazolithione at a temperature from about 25° C. to 100° C. in the presence of a catalytic amount of aqueous acid vapor sufficient to produce a pH of from about 1 to 4.5 and recovering the homopolymer produced.

18. A process for the preparation of a homopolymer of 1,3-bis-(hydroxymethyl)2-imidazolithione which consists essentially of self-condensing 1,3 - bis - (hydroxymethyl)2-imidazolithione at a temperature from about 25° C. to 100° C. in the presence of a catalytic amount of aqueous HCl vapor sufficient to produce a pH of from about 4.5 and recovering the homopolymer produced.

References Cited in the file of this patent

UNITED STATES PATENTS

| | | |
|---|---|---|
| 1,986,067 | Paquin | Jan. 1, 1935 |
| 2,373,136 | Hoover et al. | Apr. 10, 1945 |
| 2,436,311 | Larson et al. | Feb. 17, 1948 |
| 2,661,312 | Richardson | Dec. 1, 1953 |
| 2,755,198 | Stewart | July 17, 1956 |
| 2,613,210 | Hurwitz et al. | Oct. 7, 1952 |
| 2,777,857 | Konig | Dec. 14, 1956 |